US007526620B1

(12) United States Patent
McGovern

(10) Patent No.: US 7,526,620 B1
(45) Date of Patent: Apr. 28, 2009

(54) DISK SANITIZATION IN AN ACTIVE FILE SYSTEM

(75) Inventor: William P. McGovern, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 272 days.

(21) Appl. No.: 11/227,813

(22) Filed: Sep. 14, 2005

Related U.S. Application Data

(60) Provisional application No. 60/636,423, filed on Dec. 14, 2004.

(51) Int. Cl.
*G06F 12/12* (2006.01)

(52) U.S. Cl. ..................................................... 711/159
(58) Field of Classification Search .................. 711/159
See application file for complete search history.

(56) References Cited

U.S. PATENT DOCUMENTS

| 4,635,145 | A | 1/1987 | Horie et al. |
|---|---|---|---|
| 4,727,512 | A | 2/1988 | Birkner et al. |
| 4,775,969 | A | 10/1988 | Osterlund |
| 5,235,695 | A | 8/1993 | Pence |
| 5,269,022 | A | 12/1993 | Shinjo et al. |
| 5,297,124 | A | 3/1994 | Plotkin et al. |
| 5,438,674 | A | 8/1995 | Keele et al. |
| 5,455,926 | A | 10/1995 | Keele et al. |
| 5,485,321 | A | 1/1996 | Leonhardt et al. |
| 5,666,538 | A | 9/1997 | DeNicola |
| 5,673,382 | A | 9/1997 | Cannon et al. |
| 5,774,292 | A | 6/1998 | Georgiou et al. |
| 5,774,715 | A | 6/1998 | Madany et al. |
| 5,805,864 | A | 9/1998 | Carlson et al. |
| 5,809,511 | A | 9/1998 | Peake |
| 5,809,543 | A | 9/1998 | Byers et al. |
| 5,854,720 | A | 12/1998 | Shrinkle et al. |
| 5,857,208 | A | 1/1999 | Ofek |
| 5,864,346 | A | 1/1999 | Yokoi et al. |
| 5,872,669 | A | 2/1999 | Morehouse et al. |
| 5,875,479 | A | 2/1999 | Blount et al. |
| 5,911,779 | A | 6/1999 | Stallmo et al. |
| 5,949,970 | A | 9/1999 | Sipple et al. |
| 5,961,613 | A | 10/1999 | DeNicola |
| 5,963,971 | A | 10/1999 | Fosler et al. |
| 6,021,408 | A | 2/2000 | Ledain et al. |
| 6,023,709 | A | 2/2000 | Anglin et al. |

(Continued)

FOREIGN PATENT DOCUMENTS

CA   2 256 934 A1   6/2000

(Continued)

OTHER PUBLICATIONS

Chris Lueth, "WORM Storage on Magnetic Disks Using SnapLock Compliance™ and SnapLock Enterprise™", Network Appliance, Inc., Sep. 2003, sections 1-5, 13 pages.
"Network Appliance WORM Storage Solution: SEC 17 a-4(f) Compliance Assessment", Network Appliance, Inc., Jul. 10, 2003, pp. i-20.

(Continued)

*Primary Examiner*—Hyung S Sough
*Assistant Examiner*—Hamdy S Ahmed
(74) *Attorney, Agent, or Firm*—Perkins Coie LLP

(57) ABSTRACT

A method of sanitizing storage in a data storage system includes maintaining data in an active file system, and automatically sanitizing the data in the active file system according to a specified scheduling criterion.

27 Claims, 7 Drawing Sheets

U.S. PATENT DOCUMENTS

| | | |
|---|---|---|
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,134,660 A | 10/2000 | Boneh et al. |
| 6,163,856 A | 12/2000 | Dion et al. |
| 6,173,359 B1 | 1/2001 | Carlson et al. |
| 6,195,730 B1 | 2/2001 | West |
| 6,212,600 B1* | 4/2001 | Friedman et al. ............ 711/112 |
| 6,225,709 B1 | 5/2001 | Nakajima et al. |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day, III et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,397,307 B2 | 5/2002 | Ohran |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara et al. |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur et al. |
| 6,654,912 B1 | 11/2003 | Viswanathan et al. |
| 6,658,435 B1 | 12/2003 | McCall et al. |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 | 11/2004 | Carlson et al. |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 | 4/2005 | Hart et al. |
| 6,898,600 B2 | 5/2005 | Fruchtman et al. |
| 6,915,397 B2 | 7/2005 | Lubbers et al. |
| 6,931,557 B2 | 8/2005 | Togawa et al. |
| 6,950,263 B2 | 9/2005 | Suzuki et al. |
| 6,973,534 B2 | 12/2005 | Dawson et al. |
| 6,978,283 B1 | 12/2005 | Edwards et al. |
| 6,978,325 B2 | 12/2005 | Gibble et al. |
| 7,003,621 B2* | 2/2006 | Koren et al. ............ 711/103 |
| 7,007,043 B2 | 2/2006 | Farmer et al. |
| 7,020,779 B1 | 3/2006 | Sutherland |
| 7,032,126 B2 | 4/2006 | Zalewski et al. |
| 7,055,009 B2 | 5/2006 | Factor et al. |
| 7,096,331 B1 | 8/2006 | Haase et al. |
| 7,100,089 B1 | 8/2006 | Phelps |
| 7,111,136 B2 | 9/2006 | Yamagami |
| 7,111,194 B1 | 9/2006 | Schoenthal et al. |
| 7,127,388 B2 | 10/2006 | Yates et al. |
| 7,152,078 B2 | 12/2006 | Yamagami |
| 7,155,465 B2 | 12/2006 | Lee et al. |
| 7,155,586 B1 | 12/2006 | Wagner et al. |
| 7,200,726 B1 | 4/2007 | Gole et al. |
| 7,203,726 B2 | 4/2007 | Hasegawa |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0095557 A1 | 7/2002 | Constable et al. |
| 2002/0144057 A1 | 10/2002 | Li et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0005313 A1 | 1/2003 | Gammel et al. |
| 2003/0025800 A1 | 2/2003 | Hunter et al. |
| 2003/0037211 A1 | 2/2003 | Winokur |
| 2003/0120676 A1 | 6/2003 | Holavanahalli et al. |
| 2003/0126136 A1 | 7/2003 | Omoigui |
| 2003/0126388 A1 | 7/2003 | Yamagami |
| 2003/0135672 A1 | 7/2003 | Yip et al. |
| 2003/0149700 A1 | 8/2003 | Bolt |
| 2003/0158766 A1 | 8/2003 | Mital et al. |
| 2003/0182350 A1 | 9/2003 | Dewey |
| 2003/0188208 A1 | 10/2003 | Fung |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0103147 A1* | 5/2004 | Flesher et al. ............ 709/204 |
| 2004/0167903 A1 | 8/2004 | Margolus et al. |
| 2004/0168034 A1 | 8/2004 | Homma et al. |
| 2004/0181388 A1 | 9/2004 | Yip et al. |
| 2004/0181707 A1 | 9/2004 | Fujibayashi |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0097260 A1 | 5/2005 | McGovern et al. |
| 2005/0108302 A1 | 5/2005 | Rand et al. |
| 2005/0144407 A1 | 6/2005 | Colgrove et al. |
| 2005/0182910 A1 | 8/2005 | Stager et al. |
| 2005/0240813 A1 | 10/2005 | Okada et al. |
| 2006/0010177 A1 | 1/2006 | Kodama |
| 2006/0047895 A1 | 3/2006 | Rowan et al. |
| 2006/0047902 A1 | 3/2006 | Passerini |
| 2006/0047903 A1 | 3/2006 | Passerini |
| 2006/0047905 A1 | 3/2006 | Matze et al. |
| 2006/0047925 A1 | 3/2006 | Perry |
| 2006/0047989 A1 | 3/2006 | Delgado et al. |
| 2006/0047998 A1 | 3/2006 | Darcy |
| 2006/0047999 A1 | 3/2006 | Passerini et al. |
| 2006/0143376 A1 | 6/2006 | Matze et al. |
| 2006/0259160 A1 | 11/2006 | Hood et al. |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |

| | | |
|---|---|---|
| EP | 1333379 A2 | 8/2003 |
| EP | 1671231 | 6/2006 |
| WO | WO-9906912 | 2/1999 |
| WO | WO-9903098 | 11/1999 |
| WO | WO 01/18633 A1 | 3/2001 |
| WO | WO-0118633 A1 | 3/2001 |
| WO | WO 03/067438 A2 | 8/2003 |
| WO | WO-03067438 A2 | 8/2003 |
| WO | WO 2004/084010 A2 | 9/2004 |
| WO | WO-2004084010 A2 | 9/2004 |
| WO | WO-2005031576 A2 | 4/2005 |
| WO | WO-2006023990 A2 | 3/2006 |
| WO | WO-2006023991 A2 | 3/2006 |
| WO | WO-2006023992 A2 | 3/2006 |
| WO | WO-2006023993 A2 | 3/2006 |
| WO | WO-2006023994 A1 | 3/2006 |
| WO | WO-2006023995 A2 | 3/2006 |

OTHER PUBLICATIONS

Simon L. Garfinkel et al., "Remembrance of Data Passed: A Study of Disk Sanitization Practices", IEEE Security and Privacy, vol. 1, No. 1, 2003, 19 pages.
Decru, "Decru Datafort E-Series Storage Security Appliances, Transparent Data Security for Network Attached Storage (NAS)", 2004, 2 pages.
Joan Daemen et al., "Note on Naming", Rijndael, Sep. 4, 2003, 2 pages.
Joan Daemen et al., "AES Proposal: Rijndael", The Rijndael Block Cipher, Document Version 2, Mar. 9, 1999, 45 pages.
"Alacritus Announces Disk-Based Successor to Tape", Knapp Comm., Aug. 21, 2002.
"Alacritus Creates 'Next Critical Step' in Disaster Recovery for Patrick Air Force Base, Securitus VTL Sets the Pace", Apr. 20, 2004.
"Alacritus to Demo Chronospan Continuous Data Protection with the Cisco MDS 9000", Apr. 1, 2004.
"Alacritus, Hitachi CP and Nissho Team to Create Virtual Tape Library Appliance: Industry's First Virtual Tape Library Appliance to Replace Storage Tape Libraries", Alacritus Software, Inc., Jun. 25, 2001.
"Alacritus, Hitachi CP and Nissho Team to Create Virtual Library" internetnews.com, Jun. 25, 2001.
"Alacritus and Network Appliance Deliver Advanced Virtual Tape Library, Solution Shortens Backup Windows, Accelerates Data Recovery, and Simplifies Backup Management", Dec. 7, 2004.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability", Alacritus Software, Jul. 8, 2002.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Jun. 25, 2001.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Apr. 9, 2002.
"Alacritus Software Announces Virtual Tape Library Support for Legato Networker Data Protection Solution", Alacritus Software, Inc., Jan. 8, 2002.
"Alacritus Software's Chronospan: Make Time for Continuous Data Protection", Aberdeen Group, Inc., Oct. 2003.
"Alacritus Software FAQs" Alacritus Software, Inc. Jul. 2001.
"Alacritus Software's Securitus: Defining the Way to Virtual Tape Libraries", Aberdeen Group, Inc. Jul. 2003.
"Alacritus Software's Securitus: Pointing the Way to Virtual Tape Libraries", Aberdeen Group, Inc. Mar. 2002.
Baltazar, Henry "More Intelligence is on the Way" eWEEK, Sep. 15, 2003.
Baltazar, Henry "Weaving Apps into SAN Fabric" eWEEK, Mar. 24, 2003.

Barrett, Alex, "The Case for Network Smarts", Storage Magazine, Jun. 2003.
Biggar, Heidi, "Alacritus Enables Disk-Based Backup", InfoStor, Sep. 2001.
Biggar, Heidi, "Disk and Tape Forge New Partnerships in backup Arena" InfoStor, Nov. 2001.
Camphusein, Alicia, "Hitachi Inks OEM Deal with Legato", Knapp Comm., Jul. 2002.
"Case Study Shizuoka-ken Noukyou Densan Center K.K., Reducing Management Costs Through Tapeless Backup At An iDC", Apr. 7, 2004.
"Chronospan" Alacritus Website, Oct. 2003.
"Cisco and Storage ISVs to Demo Protocol-Based Interface between Storage Appliances and the Cisco MDS 9000", Mar. 30, 2004.
"Continuous Data Protection: Business Continuity for the Era of Networked Storage: An Executive White Paper", Aberdeen Group, Inc., Jul. 2003.
"Customer Success" Alacritus Website, Oct. 2003.
Joan Daemen et al., "AES Proposal: Rijndael", The Rijndael Block Cipher, Document Version 2, Mar. 9, 1999, 45 pages.
Joan Daemen et al., "Note on Naming", Rijndael, Sep. 4, 2003, 2 pages.
Decru, "Decru Datafort E-Series Storage Security Appliances, Transparent Data Security for Network Attached Storage (NAS)", 2004. 2 pages.
"Disk-Based Data Protection" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Simon L. Garfinkel et al., "Rememberance of Data Passed: A Study of Disk Sanitization Practices", IEEE Security and Privacy, vol. 1, No. 1, 2003 19 pages.
Hill, David "Alacritus Software's Securitus: Defining the Way to Virtual Taped Libraries" Aberdeen Group, Inc. Jul. 2003.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library", Alacritus Software, Inc., Oct. 3, 2001.
Hatfield. "Write Read Verify Feature Set". May 14, 2004.
Komeiga, Kevin, "Vendor Pushes Disk Backup Over Tape" SearchStorage.com, Jan. 10, 2003.
Chris Lueth, "WORM Storage on Magnetic Disks Using SnapLock Compliance™ and SnapLock Enterprise™", Network Appliance, Inc., Sep. 2003, sections 1-5 13 pages.
"Manageability: Securitus v. Tape", Alacritus Website, Oct. 2003.
Microsoft Windows XP, released 2001.
"Network Appliance WORM Storage Solution: SEC 17 a-4(f) Compliance Assessment", Network Appliance, Inc., Jul. 10, 2003, pp. i-20.
"No Changes Required: Securitus v. Tape" Alacritus Website, Oct. 2003.
Novell NetWare Server Disks And Storage Devices Administration Guide. Netware 5.1, Jan. 2000, pp. 1-60.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ "Alacritus Software Announces New Customers for Securitus VTLA", Alacritus Software, Inc. Jan. 13, 2004.
Preston, W. Curtis, "Surprise! Cheap Disks Cure Slow Backup", Storage Magazine, Jun. 1, 2002.
"Product Brief: Rhapsody/Alacritus-Securitus/Xpath Virtual Tape in the Fabric", The Enterprise Storage Group, Aug. 2002.
"Scalability: Securitus v. Tape", Alacritus Website, Oct. 2003.
"Seamless Integration", Alacritus Website, Oct. 2003.
"Securitus", Alactritus Website, Oct. 2003.
"Securitus I White Paper: Disk Based Data Protection from Alacritus Software" Alacritus Software, Inc. Jul. 2001.
"Securitus White Paper: Disk Based Data Protection from Alacritus Software", Alacritus Website, Oct. 2003.
"Strengths: Securitus v. Tape", Alacritus Website, Oct. 2003.
"Testimonials", Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"Topologies", Alacritus Website, Oct. 7, 2003.
Trimmer, Don "Tape Free Backup/Recovery: Requirements and Advantages: Virtualization Technology Will Encompass Many Applications, One of the Most Significant Possibly Being Backup/Recovery", InfoStor, Mar. 2002.
"Virtual Tape Library Technology Brochure", Alacritus Software Inc., Jul. 2001.

* cited by examiner

DISK SANITIZATION IN AN ACTIVE FILE SYSTEM

This application claims the benefit of U.S. Provisional Patent application No. 60/636,423, filed on Dec. 14, 2004 and entitled, "Disk Sanitization Using Queues," which is incorporated herein by reference.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention generally relates to data storage systems, and more specifically, relates to sanitization of disks.

BACKGROUND

When data is deleted from a magnetic disk storage device such as a hard drive, the data can often be recovered. A hard drive typically comprises many addressable data storage units known as "blocks." A file (or other logical data storage unit) typically comprises data written to the blocks, and an entry in a file structure that includes pointers that point to the blocks storing the data. The "delete" function of many file systems only removes the pointers; the data itself remains intact. Even after a low-level formatting of a hard drive, data stored on the drive may be recoverable. In certain situations, such as when the data includes sensitive information, allowing the data to remain recoverable after it has been "deleted" may be undesirable.

Several techniques for "sanitizing" a magnetic disk exist. Generally, sanitization involves affecting a disk so that data previously stored on it is unrecoverable. One way to sanitize a hard drive is to physically destroy the drive. For example, the drive may be dismantled or otherwise physically altered. Another physical method is to degauss the disk by applying a powerful alternating magnetic field to the disk. The degaussing technique changes the orientation of the magnetic particles on the disk platter.

If the drive is to be reused, it can be sanitized by writing over the data already on the disk. This is known as "media overwrite" sanitization. Media overwrite sanitization may be as simple as writing zeros to every bit on a drive, or writing different predetermined or random patterns to the drive. Writing over the drive once is known as a "single pass" overwrite. Writing over the drive multiple times is known as "multiple pass" overwrite. Different users require different levels of sanitization. For example, a user storing sensitive information, such as confidential trade secrets, may want to perform a greater number of passes.

Several different "patterns" have been developed to perform overwrite sanitization. A pattern is the sequence of bits (ones and zeros) that will be written to every bit on the drive. Using a multiple pass overwrite, different patterns may be used for each pass. For example, the first pass may use the pattern, the second pass uses the pattern's complement, and the third pass used random data.

Sanitization is typically performed at the granularity of the entire storage medium. Usually, when a hard drive or other magnetic medium is being retired or removed from use, the entire drive is sanitized to protect the data. In other instances, though, it may be desirable to sanitize only a portion of the drive. For example, storage users that are subject to government regulations regarding the retention of data may want to delete and sanitize only the files that the users are permitted to delete. The regulations may require that the user retain the other files.

A file may be sanitized as soon as it is deleted. Sanitizing a file as soon as it is deleted typically requires performing multiple overwrite sanitization before the operating system receives confirmation that the file has been deleted. However, this is extremely resource intensive, since the hard drive or other storage medium is typically required to write over the same blocks several times before the file is considered sanitized.

SUMMARY OF THE INVENTION

The present invention includes a method and a corresponding apparatus for sanitizing storage in a data storage system. In one embodiment, the method includes maintaining data in an active file system, and automatically sanitizing the data in the active file system according to a specified scheduling criterion. Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
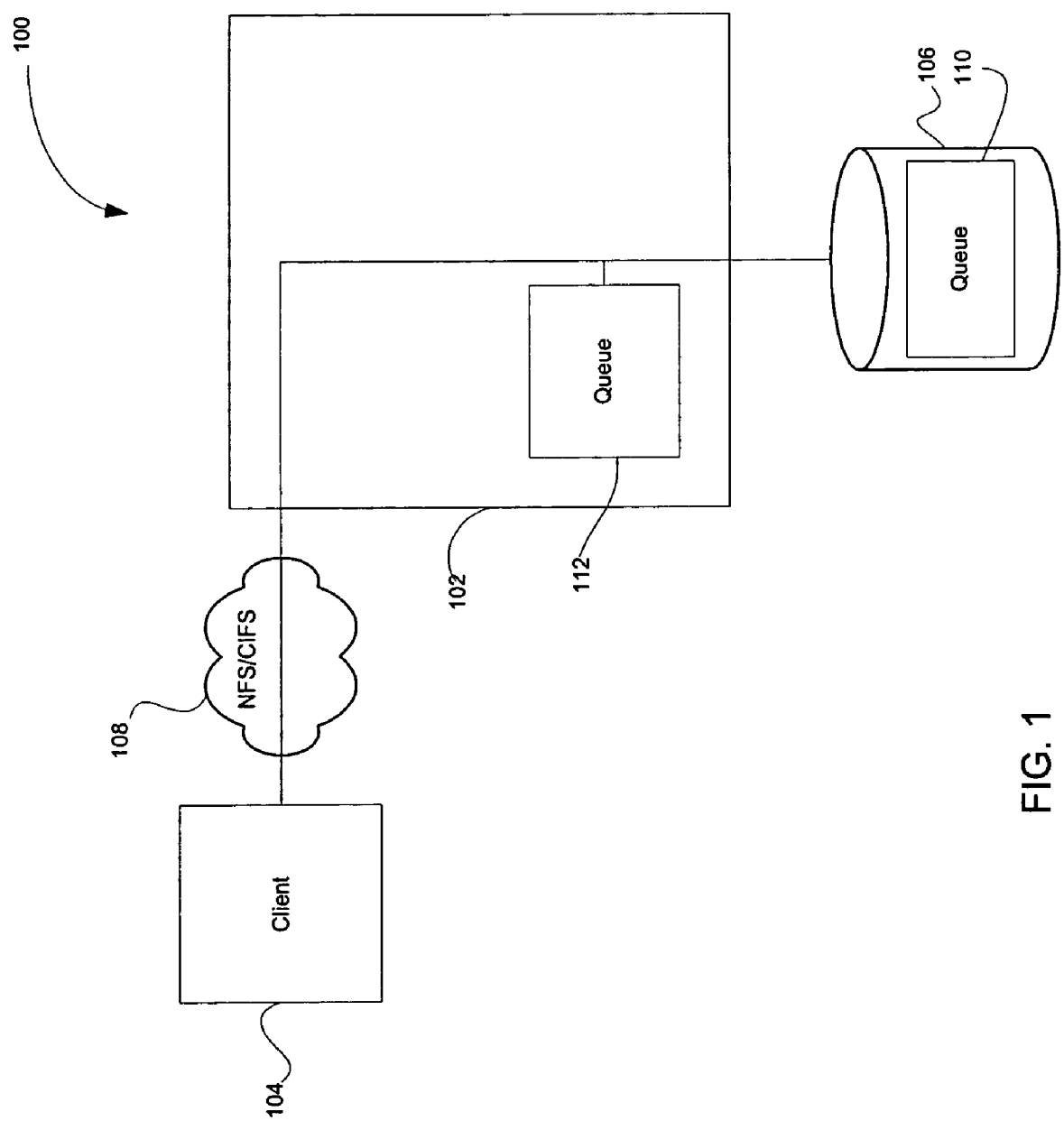
FIG. 1 illustrates a storage server that may be used to implement embodiments of the present invention.

Described herein are methods and apparatuses for disk sanitization using queues. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, when a file or other logical storage unit in an active file system is deleted, the physical data storage units (e.g., blocks) comprising the file or other logical storage unit are moved into a queue. The queue may include several pointers (references) to blocks from different deleted files. The queue is processed (i.e., the blocks referenced by the queue are sanitized) according to a specified scheduling criterion. For example, the blocks referenced by the queue may be sanitized when it exceeds a certain size, or at a predetermined interval. Sanitizing blocks using a queue mechanism allows sanitization to be done within an active file system, while the active file system remains accessible to users (e.g., for non-sanitization operations), and makes more efficient use of system resources; the system can sanitize the blocks when resources are available. Examples of non-sanitization operations of the active file system include executing read and write operations on storage devices in response to client requests, maintaining directories, etc. According to another embodiment, the queue is constantly processed, and the rate of sanitization of the queue may be increased or decreased depending on current system load. When a file is deleted, the operating system receives verification that the file has been deleted, and the blocks that comprised the file are made unavailable and inaccessible. The blocks may be sanitized at a later time, and then made available to be rewritten. This way, a large number of blocks can be sanitized at one time, improving the performance of the operating system. According to one embodiment of the invention, a queue is a logical construct, such as a file, that includes pointers (or references) to blocks of a file that has in some way been altered, including being deleted or moved to another location. The queue is used to determine which blocks need to be sanitized. When performing sanitization, a file system may parse the queue to determine an order of blocks to sanitize, so that the blocks in the queue may be sanitized at a later time, thereby consolidating sanitization activity, and improving system performance. The data blocks still exist in their original location, however their association with the file (or other logical construct) to which they originally belonged has been dissolved.

FIG. 1 illustrates a storage server that may be used to implement embodiments of the present invention. A system 100 shows a storage server 102 having a client 104 connected thereto. Using a network attached storage (NAS) configuration, the client 104 may communicate with the storage server 102 using various communication protocols such as the Network File System (NFS) or Common Internet File System (CIFS) protocols.

The client 104 accesses and uses a volume 106 for data service. The volume 106 may comprise one or more drives, including one or more magnetic disks such as hard drives. The client 104 may communicate with the storage server 102 over a network 108 using various communications protocols to store and access data stored on the volume 106. The storage server 102 may be any one of several different types of storage servers, including those that employ a NAS or Storage Area Network (SAN) approach, or both. For example, the storage server 102 may be a filer server, or filer, that stores data in the form of files.

A queue file 110 may be stored on the volume 106. The queue file 110 may be a file that includes the data storage units, such as blocks, that are waiting to be sanitized. For example, when a file is deleted, the storage server 102 may create pointers to the blocks belonging to the deleted file in the queue file 110. The process typically only requires adding pointers to the queue file that point to the deleted blocks and destroying the pointers of the deleted file. According to one embodiment, when a file is deleted, the blocks belonging to that file are added to the end of the queue file 110, so that the queue file 110 may sanitize the deleted blocks in the order they were deleted. Since the queue file 110 is persistent, if the storage server 102 loses power, the blocks, and therefore data belonging to the files will still be sanitized when power is restored, since the data is retained even when power is disrupted.

According to other embodiments, a queue 112 may comprise any other type of memory. The queue 112 may be used in place of, or in addition to, the queue 110. For example, the queue 112 may be a persistent memory such as a flash memory or a battery powered memory. According to one embodiment, the queue 112 may store pointers to the deleted blocks physically located on the volume 106. If the queue 112 is persistent, it can easily be restored if power to the storage server 102 is interrupted. Although the following description refers to a queue file, it is understood that other types queues may be used in place of a file.

Figure 2:
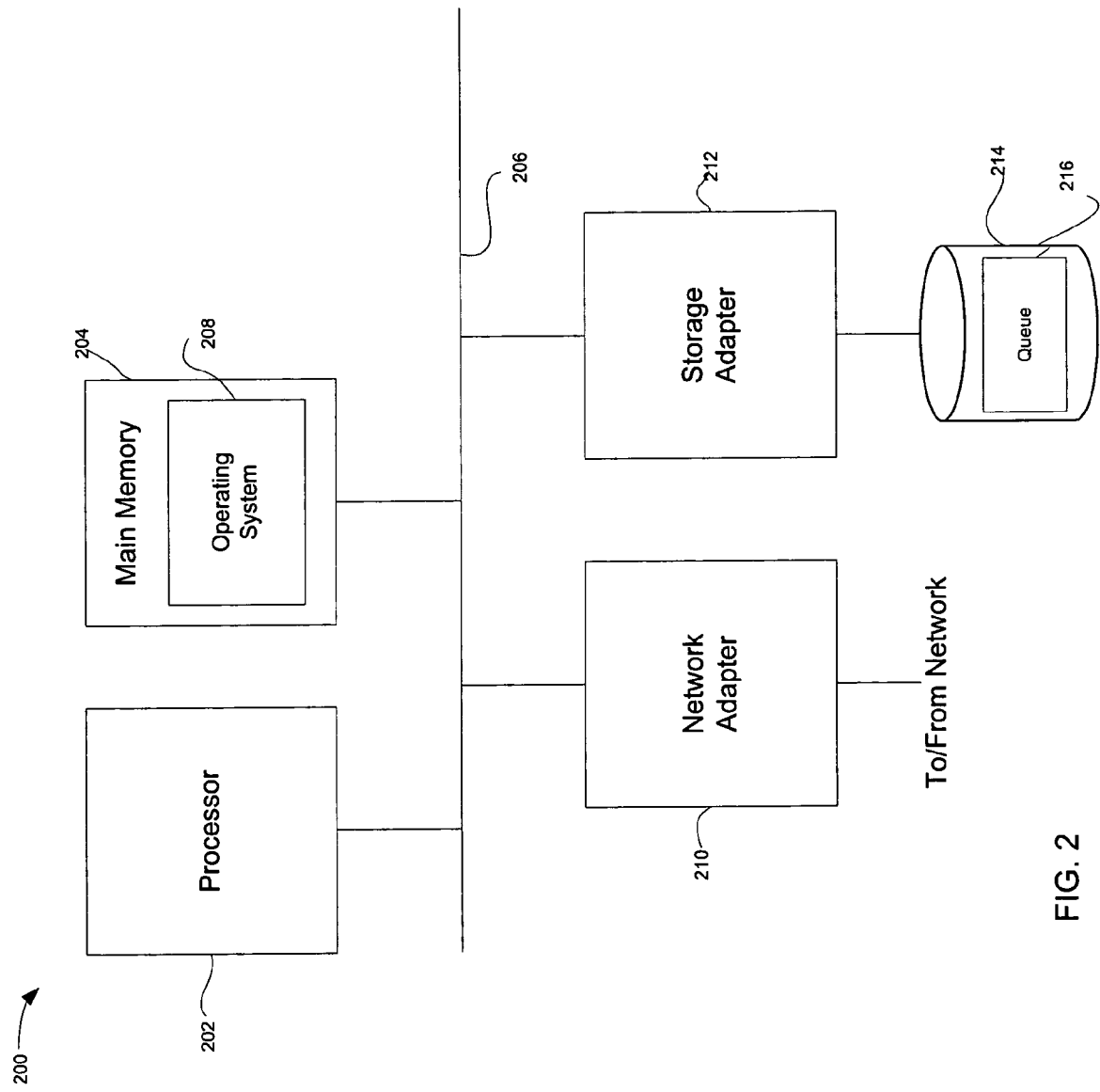
FIG. 2 shows the architecture of a filer such as the storage server, according to certain embodiments of the invention.

FIG. 2 shows the architecture of a filer 200 such as the storage server 102 according to certain embodiments of the invention. Note that certain standard and well-known components which are not germane to the present invention are not shown. The filer 200 includes a processor 202 and main memory 204, coupled together by a bus system 206. The bus system 206 in FIG. 2 is an abstraction that represents any one or more separate physical buses and/or point-to-point connections, connected by appropriate bridges, adapters and/or controllers. The bus system 206, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 202 is the central processing unit (CPU) of the filer 200 and, thus, controls the overall operation of the filer 200. In certain embodiments, the processor 202 accomplishes this by executing software stored in main memory 204. The processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 204, which is generally some form of random access memory (RAM), stores the operating system 208 of the filer 200. Techniques of the present invention may be implemented within the operating system 208, as described further below. The operating system 208 may be, for example, the ONTAP operating system by Network Appliance, Inc., of Sunnyvale, Calif. (NetApp®). Also connected to the processor 202 through the bus system 206 are a network adapter 210 and a storage adapter 212. The network adapter 210 provides the filer 200 with the ability to communicate with remote devices, such as clients and/or another filer, over a network and may be, for example, an Ethernet adapter. The storage adapter 212 allows the filer to access the external mass storage devices such as a volume 214, and may be, for example, a Fibre Channel (FC) adapter or SCSI adapter.

The volume 214 may, as described above regarding the volume 106 of FIG. 1, store a queue file 216. The queue file 216 operates in the same manner as described above. Namely, when a file is deleted by the operating system 208, the blocks comprising the deleted file are reallocated to the queue file 216. This involves creating pointers in the queue file 216 that point to the blocks formerly comprising the deleted file. The pointers in the deleted file are then destroyed, and the operating system 208 indicates that the deleted file has been deleted. The blocks remain in the queue file 216 until they are sanitized, at which point the blocks are allocated to a system free block list (which indicates that the blocks may be reallocated). The sanitization may be performed using any sanitization technique, including single and multiple overwriting using any appropriate pattern.

It is understood that although a filer 200 is described in FIG. 2, the several embodiments of the invention may be practiced using any type of computer system that maintains data storage and requires data sanitization. For example, embodiments of the invention may be implemented on a personal computer (PC), workstation, etc.

Figure 3:
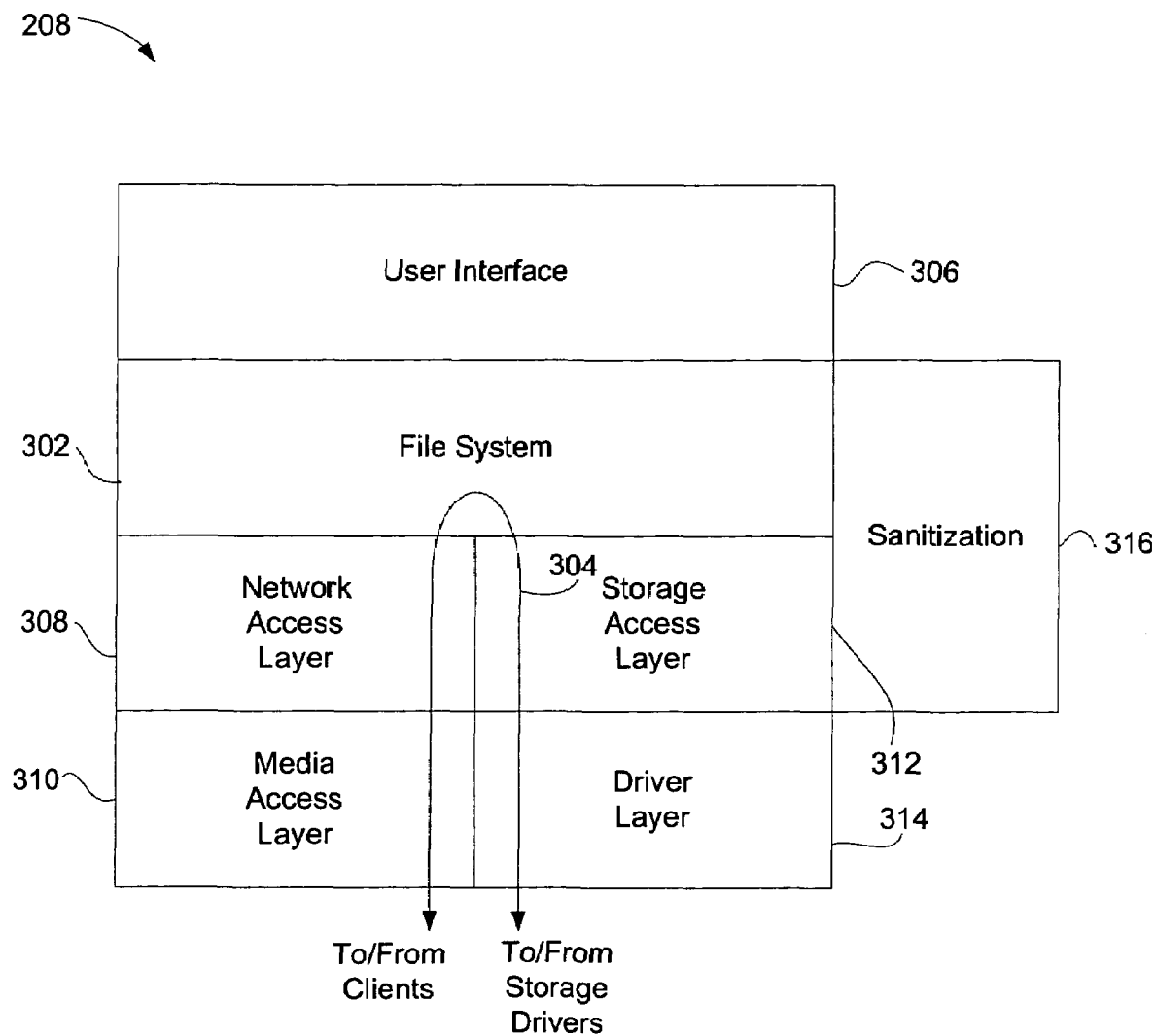
FIG. 3 illustrates the operating system of the filer of FIG. 2, according to certain embodiments of the invention.

FIG. 3 illustrates the operating system 208 of the filer 200 of FIG. 2, according to certain embodiments of the invention. As can be seen, the operating system 208 includes a number of layers. The core of the operating system 208 is the file system 302. The file system 302 is a programmatic entity that imposes structure on an address space of one or more physical or virtual storage devices, such as disks, so that the operating system 208 may conveniently read and write data containers, such as files and blocks, and related metadata. The file system 302, among other responsibilities, executes read and write operations on the mass storage devices in response to client requests, maintains directories, and manages consistency point operations. Such responsibilities of the file system are collectively referred to herein as non-sanitization operations. Embodiments of the current invention may be implemented in the file system 302. For example, the file system 302 may receive a delete command, and in response to the command, allocate the blocks belonging to the deleted file to the queue file 216 of FIG. 2. The blocks belonging to the deleted file are also made unavailable and therefore inaccessible. An example of a file system suitable for this purpose is the Write Anywhere File Layout to WAFL) file system from Network Appliance, such as used in the NetAppB Filers. The file system 302 in certain embodiments operates on blocks of data of a predetermined exemplary size, such as 4 Kbytes. Also shown in FIG. 3 is the logical data path 304 from clients to mass storage devices, through the file system 302.

The operating system 208 also includes a user interface 306, through which a network administrator or other user can control and/or configure the filer (e.g., remotely from a management station). The user interface 306 may generate a command line interface and/or a graphical user interface for this purpose. On the client side the operating system 208 (see FIG. 2) includes a network access layer 308 and, at the lowest level, a media access layer 310. The network access layer 308 implements any of various protocols used to communicate with client devices, such as network file system (NFS), common Internet file system (CIFS) and/or hypertext transport protocol (HTTP). The media access layer 310 includes one or more drivers which implemented the protocols used to communicate over the network, such as Ethernet.

On the storage device side, the operating system 208 includes a storage access layer 312 and, at the lowest level, a driver layer 314. The storage access layer 312 implements a disk storage protocol such as RAID, while the driver layer 314 implements a lower-level storage device access protocol, such as Fibre Channel or SCSI.

The operating system 208 also includes a sanitization module 316. The sanitization module 316 may be invoked by the file system 308 when the queue file 216 of FIG. 2 is to be sanitized. The sanitization module 316 may perform sanitization using single or multiple overwrites with appropriate patterns. As will be explained below, the sanitization module 316 may also sanitize the queue file 216 according to a specified scheduled criterion or constantly in the background. Note that while the sanitization module 316 is shown as a separate component, it may be implemented as a component of the active file system 302.

Figure 4A:
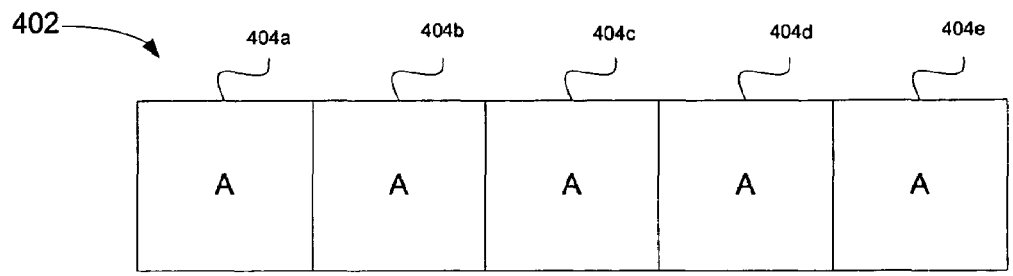
FIG. 4A illustrates a deleted file and the queue file according to one embodiment of the invention.
Figure 4B:
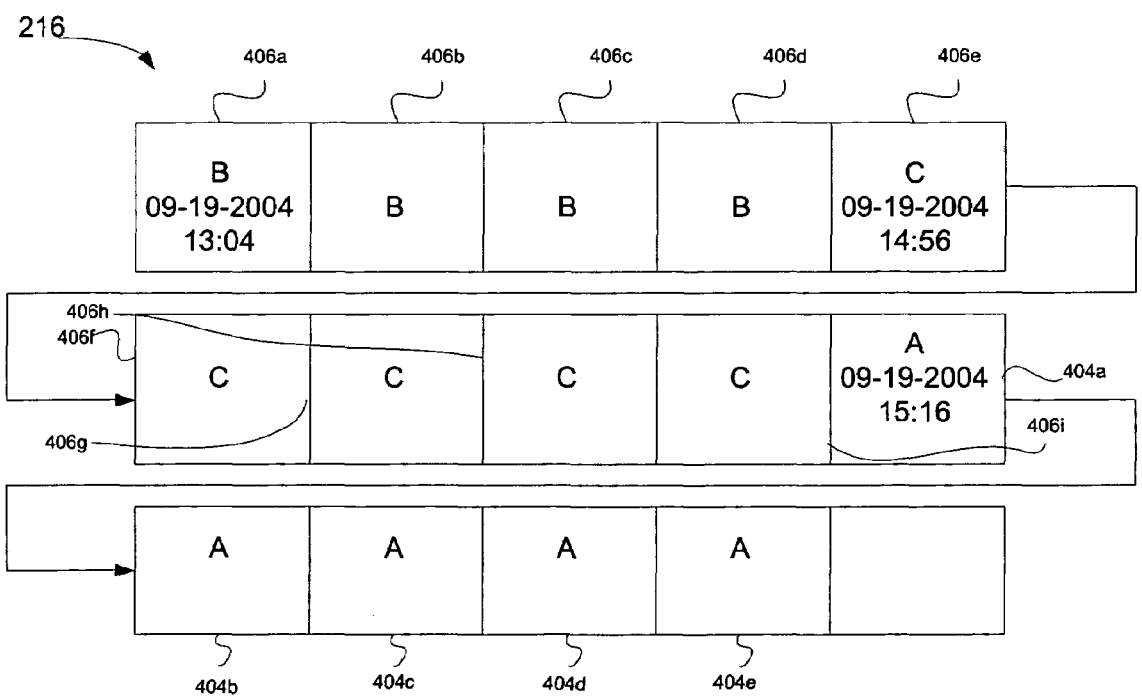
FIG. 4B illustrates a queue file according to an embodiment of the invention.

FIGS. 4A and 4B illustrate a deleted file 402 and the queue file 216 according to an embodiment of the invention. As mentioned above, the deleted file 402 and the queue file 216 are logical storage units that include pointers (or references) to the physical data storage units (the blocks) on a storage device such as a hard drive. Physical blocks can be reallocated from the deleted file 402 to the queue file 216 by creating pointers in the queue file 216 that point to the reallocated blocks and destroying all of the pointers in the deleted file 402.

The deleted file 402 is labeled file 'A'. The deleted file 'A' 402 includes five blocks 404*a-e*. The files 402 and 216, as shown in FIGS. 4A and 4B, illustrate the several blocks which are allocated to the files 402 and 216. The queue file 216 already includes several blocks 406 belonging to two previously deleted files 'B' and 'C'. According to one embodiment, the blocks 406 and 402 are sanitized in the order in which they are received. For example, the file 'B' was deleted at 13:04 on Sep. 19, 2004. The file 'C' was deleted at 14:56, and the file 'A' was deleted at 15:16. The file system 308 (see FIG. 3) may include an internal reference indicating when the files (and therefore the blocks comprising the files) were deleted. The queue file 216 is then sanitized the order in which the blocks were inserted. For example, the block 406*a* would be sanitized first.

According to other embodiments, the file system 408 may sanitize the blocks 406 and 402 using a different order. For example, if there are several blocks in the queue file 216 that are physically located near each other, the sanitization module 316 may sanitize those blocks at the same time, even if other blocks which were deleted earlier have not yet been sanitized. Additionally, there may be other considerations that may cause one to use a different order to maintain efficiency.

According to another embodiment, the sanitization process may sanitize several blocks at once. For example, it may be more efficient to sanitize a group of blocks (say ten or twenty blocks) at one time using multiple overwrites. For example, a hard drive includes a magnetic head that scans across a rotating magnetic platter to read and write to the physical blocks on the platter. If several blocks are sanitized at once, the first of the multiple overwrites may be performed during a single pass of the magnetic head. For example, while the head is moving from one end of the disk to the other, the head may write ten blocks during that pass. Ten blocks are then partially sanitized. Further passes of the magnetic head may be used to perform the subsequent necessary multiple overwrites.

After the blocks 402 and 406 are sanitized, they may be allocated to a free block list. The free block list includes a list of unused blocks that are available for use by the operating system 308 of FIG. 3. The blocks 402 and 406 are made unavailable before being returned to the free block list, requiring that the blocks 402 and 406 be sanitized before being using again.

Figure 5:
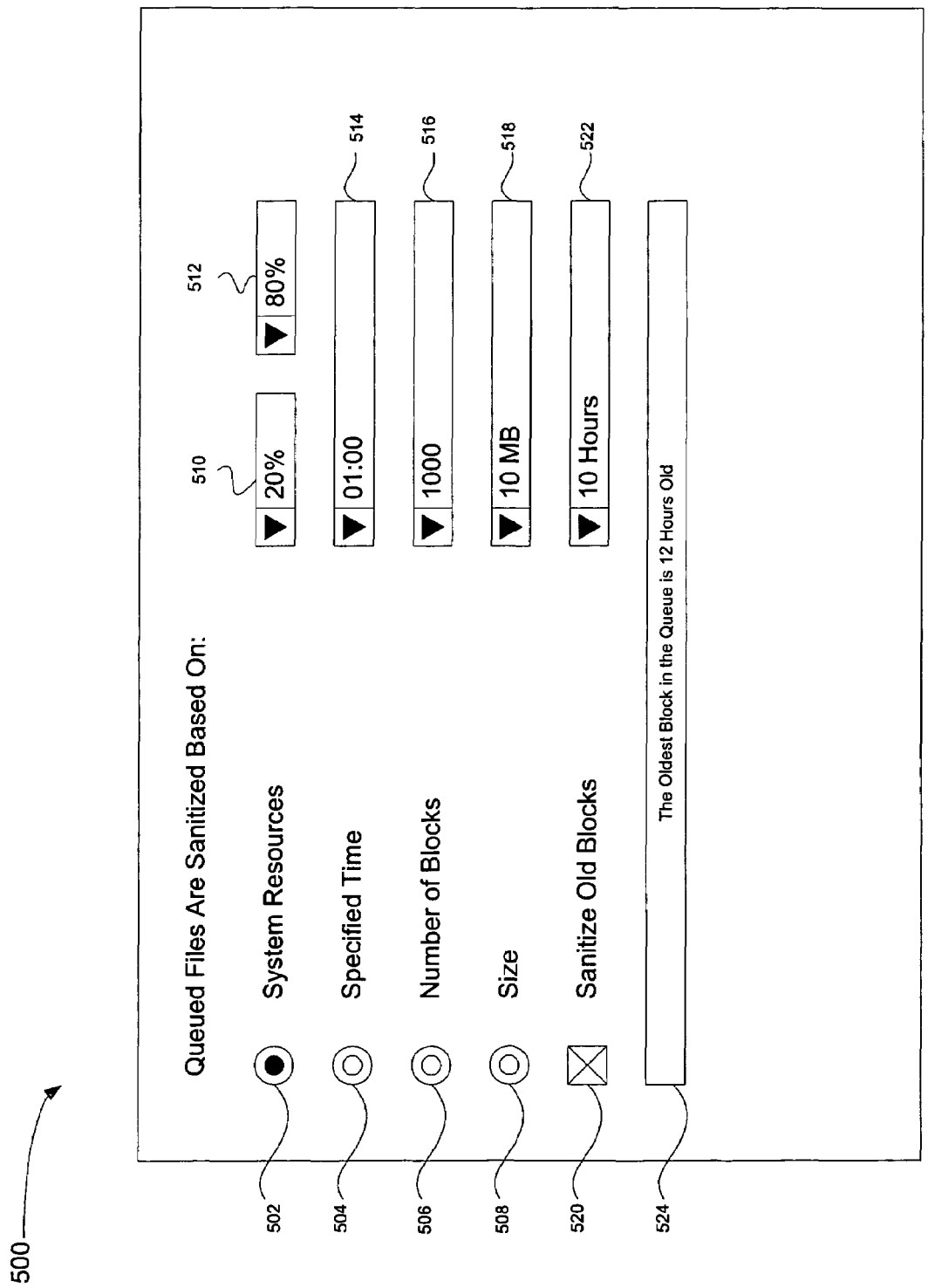
FIG. 5 illustrates a control panel that can be used to adjust sanitization settings according to an embodiment of the invention.

FIG. 5 illustrates a control panel 500 that can be used to adjust sanitization settings according to an embodiment of the invention. Sanitization may be performed using a specified scheduling criterion that determines when the blocks of the queue file 216 of FIG. 2 are sanitized. A user or system administrator can adjust the settings for sanitizing the blocks in the queue file 216 using the control panel 500. The user may select one of the radio buttons 502, 504, 506, or 508 to select a specified scheduling criterion. Each radio button 502-608 indicates a different specified scheduling criterion for sanitizing the blocks in the queue file 216.

The user may select the radio button 502 to sanitize the queue file 216 based on the level of available system resources. For example, the sanitization module 316 (see FIG. 3) may sanitize ten blocks every minute as a default. If available system resources exceed a certain level, the number of blocks processed per minute may be increased. If available system resources fall below a certain level, the number of blocks processed per minute is decreased. The 'system resources' setting is a dynamic setting which allows the system to respond to changing circumstances. According to another embodiment, another setting may allow a system administrator to choose the threshold that triggers increased or decreased rates of sanitization. For example, two pull-down menus 510 and 512 may respectively be used to indicate the percentage of available system resources that trigger a reduced rate of sanitization (a bottom threshold) and an increased rate of sanitization (a top threshold). Changing the rate of sanitization based on available resources improves system performance while still processing the queue file 216 in a reasonable amount of time. According to one embodiment, the blocks in the queue file 216 are sanitized using a first-in first-out (FIFO) methodology (i.e., the first blocks deleted are the first blocks sanitized).

The user may also select the radio button 504 to clear the queue file 216 (see FIG. 2) at a specified time. The time may be chosen using the pull-down menu 514. For example, the sanitization module 316 (see FIG. 3) may sanitize the blocks in the queue file 216 every day at 01:00. Sanitization may be part of regular system maintenance. According to another embodiment, the file system 308 (see FIG. 3) may invoke the sanitization module 316 at other times, if necessary, to increase the amount of free space on the volume 214 (see FIG. 2). This may be necessary when there is too little free space on the volume 316.

The radio button 506 sanitizes the entire queue file 216 (see FIG. 2) when more than a specified number of blocks is allocated to the queue file 216. The pull-down menu 516 may be used to indicate the threshold number of blocks. Alternatively, the radio button 508 may be selected to indicate that the queue file 216 should be sanitized when it exceeds a certain size. The threshold size may be selected using the pull-down menu 518. These options may be helpful when a user is trying to limit the amount of space consumed by files waiting to be sanitized.

According to another embodiment, a check box 520 may be selected to indicate that the user wishes to sanitize all 'old' blocks. 'Old' blocks may be defined as those that have been in the queue file 216 (see FIG. 2) for a time longer than that specified using a pull-down menu 522. For example, whenever a block has been in the queue file 216 for more than 10 hours, the block is automatically sanitized. Additionally, a text box 524 may be added to the control panel 500. The text box 524 indicates the age of the oldest block in the queue. This information may be useful to help a user determine that the queue needs to be sanitized at either a slower or a faster rate.

It is understood that other configurations of the panel 500 may be chosen. For example, the pull-down menus 510-518 may be implemented as fill-in fields, the radio buttons 502-508 may be implemented as a pull-down menu, or the check box 520 may be implemented as a radio button. According to other embodiments, other criteria may be implemented in the panel 500. Further, according to another embodiment, the control panel 500 may be controlled by the file system 208 (see FIG. 2) or by another process other than a user.

Figure 6:
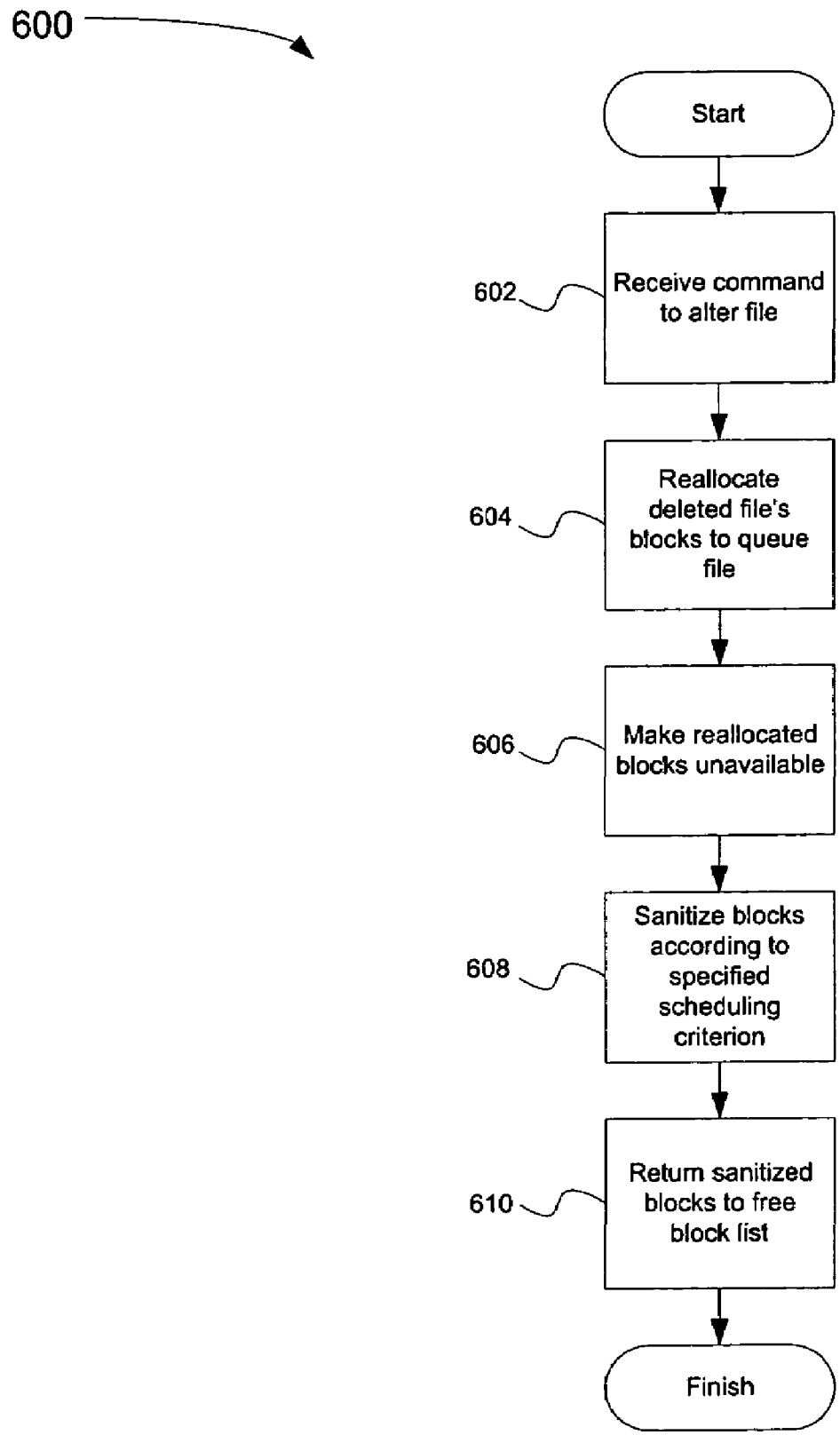
FIG. 6 is a flowchart describing a process for deleting and sanitizing a file or other logical storage unit according to an embodiment of the invention.

FIG. 6 is a flowchart describing a process for deleting and sanitizing a file or other logical storage unit according to an embodiment of the invention. In block 602, the file system 308 (see FIG. 3) receives a command to alter a file. The command may be issued by a user or other system process such as an application. The command may be, for example, a delete command or a move command. The command may be any command that removes the association between a block and a file, and may also include processes such as disk defragmentation. The result of the command is one or more blocks that are written to but are no longer part of a file. In block 604, the blocks formerly belonging to the file are reallocated to the queue file 216 (see FIG. 2) as described above. According to other embodiments, references to the blocks may be created in queues stored in other memories.

In block 606, the reallocated blocks are made unavailable. The file system 308 (see FIG. 3) may mark the blocks as unavailable to processes of the file system 308. This facilitates the sanitization process, since the blocks cannot be reused until they have been sanitized. In block 608, the blocks are sanitized according to a specified scheduling criterion. The specified scheduling criterion may be one of the criteria described above in FIG. 5, or it may be another criterion appropriate for the situation. In block 608, the process 600 may sanitize either a portion of the queue file 216 (see FIG. 2) or the entire queue file 216. In block 610, the sanitized blocks are returned to the free block list, so that the sanitized blocks may be used again.

Figure 7:
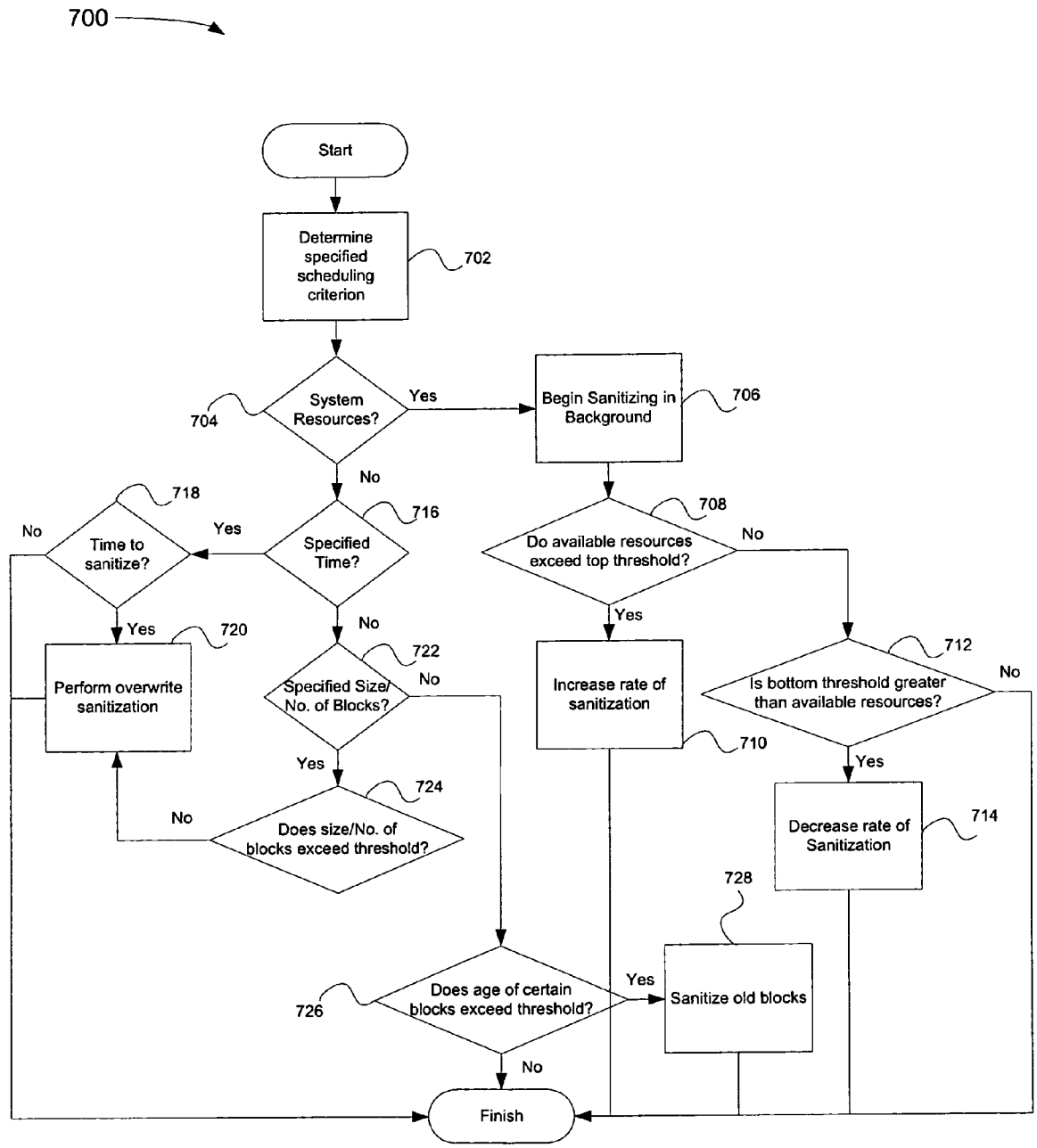
FIG. 7 is a flowchart describing a process for sanitizing blocks according to one embodiment of the invention.

FIG. 7 is a flowchart describing a process 700 for sanitizing blocks according to one embodiment of the invention. The process 700 may be initiated at block 608 of FIG. 6. The process 700 describes procedures taken by the sanitization module 316 of FIG. 3 to process the queue file 216 of FIG. 2. The process 700 may represent a single iteration of a sanitization process. The sanitization process may repeatedly perform the process 700.

In block 702, the sanitization module 316 of FIG. 3 determines which specified scheduling criterion has been chosen by the system administrator or other process. The scheduling criterion may be any of those described above, or any other scheduling criterion that may be appropriate.

In block 704, it is determined whether the scheduling criterion is the system resources criterion indicated by the radio button 502 of FIG. 5. If the scheduling criterion is the system resources criterion, the process 700 continues to block 706. If the scheduling criterion is not the system resources criterion, the process 700 continues to block 716.

In block 706, the sanitization process begins in the system background. In other words, the system may sanitize blocks in the queue file 216 (see FIG. 2) while other system processes (such as applications) are running. In block 708, it is determined whether the available system resources exceed the top threshold which may be selected using the pull-down menu 510 (see FIG. 5). If the available resources exceed the top threshold, the rate of sanitization is increased in block 710. In other words, more blocks are sanitized per unit time. If the available resources do not exceed the top threshold, in block 712 it is determined whether the bottom threshold is greater than the available system resources. If the available system resources are less than the bottom threshold (as set using the pull-down menu 512 of FIG. 5), the system needs more available resources for other processes, and the rate of sanitization is reduced in block 714. If the level of available system resources is greater than the bottom threshold and less than the top threshold, the process 700 finishes.

In block 716, it is determined whether the specified scheduling criterion is the specified time criterion that may be chosen using the radio button 504 of FIG. 5. The specified time criterion sanitizes the entire queue file 216 (see FIG. 2) at the specified time. If the criterion is the specified time criterion, in block 718, it is determined whether the time specified using the pull-down menu 514 (see FIG. 5) has passed and the sanitization has not occurred. If the criterion is not the specified time criterion, the process 700 continues to block 722. If it determined in block 718 that it is time to perform the sanitization, the queue file 216 is sanitized in block 720. If it is not time to perform the sanitization, the process 700 finishes.

In block 722, it is determined whether the criterion is either the size or number of blocks criteria, chosen by either the radio buttons 506 or 508 (see FIG. 5) respectively. If the criterion is either the size of number of blocks criterion, in block 724, it is determined whether the size of the queue file 216 (see FIG. 2) or the number of blocks allocated to the queue file 216 exceeds the thresholds chosen using the pull-down menus 516 or 518 (see FIG. 5), respectively. If the size or number of blocks in the queue file 216 exceeds these thresholds, the process 700 continues to block 720, where the queue file 216 is sanitized. If the size or number of blocks in the queue file 216 does not exceed the thresholds, the process 700 finishes.

If, in block 722, it is determined that the criterion is not either the size or number of blocks criterion, in block 726, it is determined whether the age of the oldest blocks in the queue file 216 (see FIG. 2) exceeds the threshold chosen using the pull-down menu 522 (see FIG. 5). If so, the 'old' blocks (those older than the threshold) are sanitized in block 728. If not, the process 700 is finished.

The techniques introduced above have been described in the context of a network attached storage (NAS) environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

For example, using one embodiment of a SAN, the sanitization module 316 may be a part of file system of the client 104. Using this embodiment, a client sanitizes blocks stored by the SAN. According to another embodiment, a "virtualized" SAN may be used. A virtualized SAN may include a file having a number of blocks that are available for use by clients. Using this virtual SAN, a client may access the pool of blocks in the file as though the file were a standard SAN device.

This invention has been described with reference to specific exemplary embodiments thereof. It will, however, be evident to persons having the benefit of this disclosure that various modifications changes may be made to these embodiments without departing from the broader spirit and scope of the invention. The specification and drawings are accordingly to be regarded in an illustrative rather than in a restrictive sense.

What is claimed is:

1. A method for sanitizing storage in a data storage system, the method comprising:
   maintaining a queue of pointers pointing to a plurality of data storage units in a physical storage facility, wherein each of the plurality of data storage units contains data deemed discarded in an active file system; and
   automatically sanitizing the plurality of data storage units according to a specified scheduling criterion, wherein said sanitizing is performed by overwriting the data on the plurality of data storage units and causing the data to be unrecoverable from the physical storage facility, and wherein the active file system remains accessible for non-sanitization operations during said sanitizing.

2. The method of claim 1, wherein said automatically sanitizing the plurality of storage units is performed by a component of the active file system.

3. The method of claim 1, further comprising:
   making a data storage unit of the plurality of data storage units unavailable to a host processor until the data storage unit is overwritten.

4. The method of claim 1, wherein the overwriting comprises overwriting the plurality of data storage units multiple times.

5. The method of claim 1, wherein the specified scheduling criterion is dynamic.

6. The method of claim 5, further comprising:
   determining the specified scheduling criterion based on available system resources.

7. The method of claim 5, further comprising:
   increasing a number of data storage units sanitized per unit time when the available system resources increase; and
   decreasing the number of data storage units sanitized per unit time when the available system resources decrease.

8. The method of claim 1, wherein maintaining a queue of pointers comprises maintaining a queue file.

9. The method of claim 8, further comprising:
   adding new data storage units corresponding to a deleted file to the queue file when the deleted file is deleted.

10. The method of claim 1, further comprising:
    receiving a command to delete a user file including a set of data storage units; and
    allocating the data storage units to the queue until the data storage units are sanitized.

11. A storage system comprising:
    an active file system;
    a queue of pointers pointing to a plurality of data storage units in a physical storage facility, wherein each of the plurality of data storage units contains data deemed discarded in the active file system; and
    a processor coupled with the physical storage facility, to receive a command to alter a logical storage unit including a set of data storage units maintained by the active file system of the storage system, and in response to the command, to allocate the set of data storage units to the queue, and to sanitize the plurality of data storage units according to a specified scheduling criterion, wherein the sanitization is performed by overwriting the data on the data storage units and causing the data to be unrecoverable from the physical storage facility, and wherein the active file system remains accessible for non-sanitization operations during said sanitization.

12. The storage system of claim 11, wherein the specified scheduling criterion is user configurable.

13. The storage system of claim 11, wherein the specified scheduling criterion is dynamic.

14. The storage system of claim 13, wherein the specified scheduling criterion is based on available system resources.

15. The storage system of claim 14, wherein the processor increases a rate of sanitization when the available system resources exceed a top threshold, and wherein the processor decreases the rate of sanitization when the available system resources are below a bottom threshold.

16. The storage system of claim 11, wherein the specified scheduling criterion depends on a size of the queue.

17. The storage system of claim 11, wherein the queue is a file.

18. The storage system of claim 17, wherein the data storage units are blocks.

19. The system of claim 11, wherein the processor sanitizes the queue using multiple overwrite sanitization.

20. The storage system of claim 11, wherein the data storage units of the queue are unavailable.

21. A method for sanitizing storage, the method comprising:

receiving a command to alter a file;

reallocating a set of blocks comprising the file to a queue file and altering the file according to the command, wherein the queue file comprises a queue of pointers pointing to the set of blocks;

making the set of blocks unavailable to processes other than sanitization; and sanitizing the set of blocks in the queue file according to a specified scheduling criterion, wherein said sanitizing is performed by overwriting data on the set of blocks and causing the data to be unrecoverable, and wherein an active file system remains accessible for non-sanitization operations during said sanitizing.

22. The method of claim 21, wherein said sanitizing comprises automatically sanitizing the set of blocks in the active file system.

23. The method of claim 22, wherein the sanitizing is a background process, such that the active file system remains accessible to a user during said sanitizing.

24. The method of claim 22, wherein said automatically sanitizing the data in the active file system is performed by a component of the active file system.

25. The method of claim 21, further comprising:

setting the specified scheduling criterion in response to a user selection.

26. The method of claim 21, wherein the specified scheduling criterion is dynamic.

27. The method of claim 26, further comprising:

varying a rate of sanitization based on available system resources.

* * * * *